Patented May 21, 1935

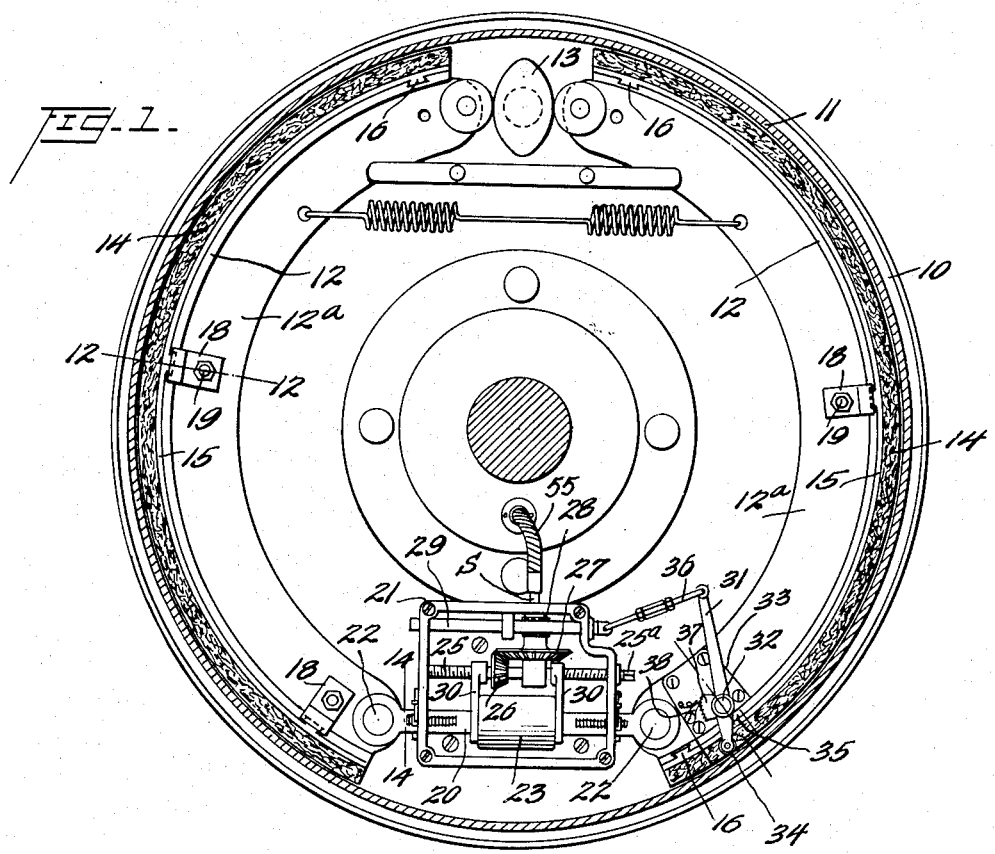

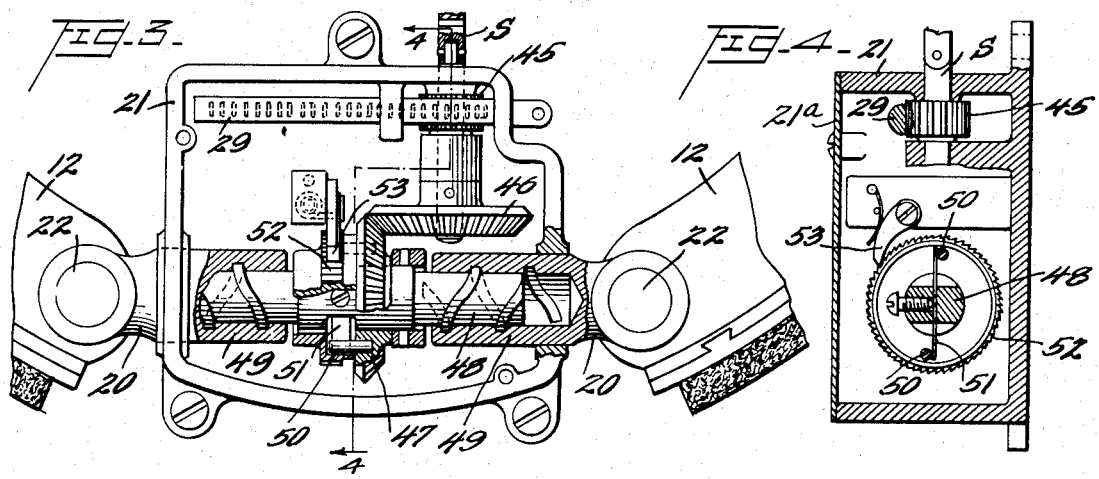

2,002,139

UNITED STATES PATENT OFFICE 2,002,139

AUTOMATIC BRAKE ADJUSTING AND INDICATING MECHANISM

John B. Des Rosiers, Providence, R. I.

Application January 27, 1933, Serial No. 653,874

21 Claims. (Cl. 188—79.5)

This invention relates to brake mechanism adapted for use on vehicles such as automobiles, trucks, buses and the like, and is concerned particularly with means for automatically adjusting the brake mechanism to compensate for the wear on the brake linings and for indicating the extent of wear on the linings.

The invention is applicable to any form of brake mechanism in which brake shoes cooperate with a rotating braking member, such as a disc or drum. It will be described with particular reference to a brake mechanism of the internal type having brake shoes arranged within a drum and expanded outwardly to contact therewith.

One object of the invention is to provide means by which the brake shoes will be automatically adjusted relative to the rotating brake member or drum to take up clearance and compensate for the wear on the linings, such adjustment being brought about by the movement of the brake shoes toward the drum in applying the brakes when such movement becomes excessive due to the wear on the brake linings.

More specifically, the invention provides an adjustable pivot member for each brake shoe and means for gradually and automatically adjusting such pivot members toward the drum as the brake linings wear away in service, such automatic adjustment being effected by the increased movement of the brake shoes toward the drum which results from the wear on the linings.

A further object of the invention is to provide an indicating mechanism which is adapted to be attached to the instrument board of the automobile or at any other convenient place and afford a visible indication at all times as to the extent to which the brake linings have been worn away.

A still further object is to provide detailed improvements in mechanism of this kind which will automatically adjust the brakes and also indicate continuously the extent of wear on the brake linings.

A still further object is to provide improved means for securing brake linings to brake shoes.

The foregoing and other objects and advantages are attained by the mechanism illustrated in the accompanying drawings and described in the following specification, it being understood that the particular mechanism herein shown and described is illustrative only as the invention is obviously capable of embodiment in various forms included within the scope of the appended claims.

Referring to the drawings:

Figure 1 is a vertical plan view of the invention applied to a brake mechanism having outwardly expanding brake shoes, the parts being shown in the position they occupy when the brake linings have not been worn substantially;

Figure 2 is a partial vertical section of the arrangement shown in Figure 1, certain parts being shown in the position they occupy after the linings have been considerably worn away;

Figure 3 is a vertical section of a modified arrangement for automatically adjusting the brake shoes;

Figure 4 is a section substantially on the broken line 4—4 of Figure 3;

Figure 5 is a diagrammatic view showing the operating connections between the brake adjusting mechanism on each wheel and the indicating device;

Figure 6 is a side view of the arrangement shown in Figure 5;

Figure 7 is a front view of the brake indicator or meter;

Figure 8 is a side view thereof;

Figure 9 is a sectional view of one of the individual indicators, there being a similar individual indicator for each wheel;

Figure 10 is a vertical section through one of the indicating drums taken on the line 10—10 of Figure 9;

Figure 11 is a detail view of the ratchet arrangement used in each indicator;

Figure 12 is a transverse section on the line 12—12 of Figure 1;

Figure 13 is a transverse section on the line 13—13 of Figure 1;

Figure 14 is an enlarged sectional view taken substantially on the line 14—14 of Figure 1; and Figure 15 is a diagram showing the designations employed on the outer surface of each of the indicating drums.

Referring to the drawings in detail by the reference characters thereon, the mechanism illustrated comprises the usual backing plate or flange 10 which acts as a carrier or housing for the various parts of the brake mechanism, and adjacent to which the brake drum 11 is supported and rotates. The brake mechanism as illustrated includes two brake shoes 12 which are adapted to be expanded or forced outwardly against the brake drum by means of the usual cam 13. The outer surface of the shoes 12 is provided with brake linings 14 to frictionally engage the inner surface of the drum.

In attaching the brake linings to the shoes I prefer to use an improved arrangement in which the linings 14 are secured to relatively thin plates 15, being riveted or otherwise suitably secured to such plates. The plates 15 are provided on their inner surfaces with a plurality of dovetailed tongues or lugs 16 which terminate a little short of one edge of the plate. The outer surfaces of the brake shoes have transverse dovetailed recesses which are adapted to receive and snugly engage these dovetailed lugs. The plates 15 are assembled on the shoes by inserting the dovetailed lugs 16 in the corresponding recesses in the shoes and then pressing the plates laterally across the shoes. As shown particularly in Figure 12, the dovetailed recesses do not extend entirely across the outer surface of the shoes but terminate a short distance from the edge thereof, thus providing stops or abutments 17 against which the ends of the dovetailed tongues 16 are adapted to engage to accurately position the plates 15 on the shoes. These plates are preferably held in position by means of angular clips 18, the outer ends of which engage the edge of the plate 15 and the inner portions of which are secured by bolts 19 to the inwardly projecting flanges 12A on the shoes. This arrangement provides means by which the brake linings can be easily and quickly renewed without detaching the brake shoes from the backing plate. All that is necessary is to remove the clips 18 and slide the plates 15 laterally from the shoes. New plates with new linings may then be inserted, or new linings applied to the old plates which can be again put into position on the brake shoes.

The brake shoes 12 are pivotally connected at their lower ends to adjustable pivot members 20, slidably supported in a box or housing 21 which is bolted or otherwise firmly attached to the backing plate 10 between the adjacent ends of the shoes 12. This housing is preferably made of two parts divided vertically as illustrated particularly in Figure 14, and such parts are bolted or otherwise suitably secured together. The connection between the brake shoes 12 and the adjusting members 20 preferably consists of a pivot pin or stud 22 over which the outer ends of the adjusting members 20 engage. In the arrangement shown in Figures 1 and 2 the adjusting members 20 on their inner ends are provided with hollow cylindrical portions 23, one of which is preferably arranged to slide in the other. A coiled spring 24 is mounted in the cylindrical portions 23, this spring being under considerable tension at all times, so that it tends to force the adjusting members 20 outwardly. Arranged within the housing 21 is a shaft 25 which carries a gear wheel 26 arranged to engage a second gear wheel 27 rigidly secured to a shaft S suitably supported in the housing 21. Secured to the hub of the gear wheel 27 is a pinion 28 which latter is engaged by a slidable rack bar 29, which is adapted to be operated in a manner hereinafter described.

The shaft 25 on its opposite ends is provided with right and left hand threads, and such threaded portions are engaged by threaded arms 30, these arms extending downwardly and engaging over the adjusting members 20 between the cylindrical portions 23 thereof and the adjacent sides of the housing. When the shaft 25 is rotated, it will be seen that the arms 30 are caused to move in opposite directions inwardly or outwardly depending on the direction of rotation of the shaft 25. If the arms 30 are moved outwardly, the spring 24 will expand and force the adjusting members 20 outwardly and thus move the brake shoes toward the brake drum. One end of the shaft 25 is squared as at 25a to receive a key by which the shaft may be rotated to move the arms 30 inwardly to reset the device.

A control lever or member 31 is pivotally supported as at 32 on the inwardly extending flange of one of the brake drums or preferably on a plate 33 secured to said flange. The outer or short end of the lever 31 is provided with a small roller 34 which is arranged in a notch or cutaway portion 35 provided in the outer flange of the brake drum, and a similar notch is also provided in the brake lining 14. The inner or long arm of the lever 31 is connected by an adjustable link 36 to the rack bar 29. A ratchet segment 37 is rigidly secured to the lever 31 and this segment is engaged by a dog 38 so that when the lever 31 is moved toward the right it is held by the ratchet segment and dog against return movement.

Each of the adjusting members 20 is provided on its outer surface with a notched or rack portion 40 at the point where said adjusting members pass through the sides of the housing 21. Each of the notched portions 40 is engaged by a slidable dog 41 mounted on the housing 21 and held down by a flat spring 42, the lower end of the dogs 41 being inclined to permit outward movement of the adjusting members 20 but serving to prevent inward movement thereof relative to the housing 21.

The outer end of the control lever 31 is preferably of such length that the roller 34 will not contact with the brake drum when the brake lining 14 is of normal thickness, that is, when it is not worn away to a substantial extent. But as the lining is gradually worn down, the roller 34 will come in contact with the brake drum when the brake shoes 12 are moved toward the drum in applying the brakes. When the roller 34 is thus forced against the drum the lever 31 will be caused to rotate on its pivot, and this rotation will move the rack bar 29 and rotate the gears 27 and 26 and the shaft 25 with the result that the arms 30 will be moved outwardly away from the cylindrical portions 23 on the adjusting members 20. When the pressure on the brake shoes is released the spring 24 will expand the adjusting members 23 and force the same outwardly until they contact with the arms 30. This outward movement of the cylindrical portions 23 and members 20 will produce an adjustment of the brake shoes 12 relative to the brake drum.

After the control lever 31 has been moved about its pivot as described, return movement of the same is prevented by the rack segment 37 and dog 38.

It will thus be seen that as the brake linings wear down and the lever 31 is caused to gradually move more and more about its pivot 32, the adjusting members 20 will be gradually moved outwardly and the brake shoes gradually adjusted relative to the brake drum. The initial position of the control lever 31 is illustrated in Figure 1 and its position after the linings are substantially worn out is illustrated in Figure 2.

After the linings are sufficiently worn to require replacement and when new linings are applied it will be understood that the adjusting members 20 are restored to their original position by releasing the dogs 41 and rotating the shaft 25, the dog 38 also being released to permit the lever 31 to assume its original position.

In Figure 3 of the drawings, a modified arrangement for automatically adjusting the brake shoes is shown, which is mounted in a housing substantially the same as that shown in Figures 1 and 2, the housing having a removable cover plate 21a thereon. In this arrangement, the rack bar 29 engages a pinion 45 rigidly mounted on a shaft S, which corresponds with the pinion 28 and shaft S in the arrangement shown in Figures 1 and 2. The inner end of the shaft S carries a beveled gear 46 arranged to mesh with a second beveled gear 47 rotatably mounted on a shaft 48. The opposite ends of the shaft 48 are arranged in cylindrical members 49 forming the inner portions of the adjusting members 20 and these cylindrical members 49 are provided internally with right and left hand thread grooves respectively, which grooves are engaged by corresponding threads on the opposite ends of the shaft 48.

The gear 47 is provided on one face with two oppositely disposed pins 50 rigidly secured thereto and projecting laterally therefrom parallel with the axis of the shaft 48. A flat spring member 51 is firmly secured to the shaft 48 and the opposite ends of this spring member project outwardly in position to contact with the pins 50. As the gear 47 is rotated counterclockwise as seen particularly in Figure 4, it will be apparent that the pins 50 will contact with the opposite ends of the spring 51 and bend the same, assuming that the shaft 48 is held against rotation at such time.

Rigidly secured to the shaft 48 adjacent the gear 47 is a ratchet wheel 52 engaged by a spring pressed dog 53. This ratchet wheel will permit rotation of the shaft 48 in a counterclockwise direction as seen particularly in Figure 4, but will prevent its rotation in the opposite direction.

With this arrangement, when the control lever 31 is caused to move about its pivot by pressure on the brake shoes, the rack bar 29 is moved toward the right as heretofore described and the gears 45, 46, 47 are caused to rotate. Due to the pressure on the brake shoes 12 the shaft 48 will be held against rotation at the time the gears 45, 46 and 47 are rotated, with the result that the pins 50 on the gear 47 will bend the spring 51 to a certain extent depending upon the amount of rotation of the gear 47. When the pressure on the brake shoes is released, the gear 47 and cooperating gears 46 and 45 are held against return movement by the lever 31 and rack segment 37 thereon. The result is that the tension on the spring 51 will cause rotation of the shaft 48 in a counterclockwise direction as illustrated in Figure 4, and such rotation of the shaft will force the adjusting members outwardly to move the brake shoes toward the drum and thus automatically adjust the same. Reverse rotation of the shaft 48 is prevented by the dog 53. In this form of device, the parts are also accessible for resetting when new linings are applied to the brake shoes.

One of the features of my invention consists in providing an indicating means which will show at all times the extent to which the brake linings are worn. This indicating means is intimately associated with the adjusting mechanism above described.

It will be understood that the automatic adjusting mechanism heretofore described is intended to be applied to each wheel of a vehicle. Connected to the shaft S of the adjusting mechanism on each wheel is a flexible drive shaft 55 which may be of any form, such as the ordinary flexible coiled wire transmission shaft. Each of the shafts 55 is connected to an indicator such as shown particularly in Figure 9, there being four indicators, one for each wheel of the vehicle. Each of these indicators comprises a casing 56 having a shaft 57 rotatably supported therein and to which a beveled gear wheel 58 is secured and which meshes with a beveled gear wheel 59 to which the shaft 55 is connected. Mounted on one end of the shaft 57 is an indicating drum 60, and a coiled spring 61 is arranged within the drum, one end of this spring being anchored to a pin 62 secured to the casing 56 and the other bearing against a hub on the drum 60. This spring acts as a friction brake to prevent overrunning or rattling of the shaft 57 and drum 60. Mounted on the shaft 57 opposite the drum 60 is a ratchet wheel 63 which is engaged by a spring pressed dog 64 which serves to prevent rearward movement of the wheel 63, shaft 57 and drum 60.

From the foregoing it will be understood that for each wheel as the shaft S of the adjusting mechanism is rotated by the rack bar 29, the flexible shaft 55 will produce a corresponding rotation of the indicating drum 60. The outer surface of the drum 60 is preferably provided with face of the drum 60 is preferably provided with indications as illustrated in Figure 15. The first part of this surface is colored green and the latter part red. Also, the numbers thereon illustrate roughly the extent to which the brake linings are worn; the number 100, for example, indicating that the linings are of full thickness, and the number 25 indicating that they are substantially worn out. Likewise the green color serves to indicate that the linings are in satisfactory condition, while the red indicates a badly worn condition of the linings. When the adjusting mechanism is in the position shown in Figure 1 and the brake linings are of full thickness, the indicating drum for each wheel will show green and the number 100 will be visible. As the parts of the adjusting mechanism gradually move toward the position shown in Figure 2, the drum 60 will be gradually rotated until the red indication appears, thus showing that the linings are worn out.

For convenience, the four casings 56 are preferably mounted on a single base plate 65, this plate being provided with four openings through which the four drums 60 are visible. The base plate 65 may be secured to the instrument board of the vehicle or at any other convenient point, and it serves to give a visible indication at all times as to the condition of the brake linings on each wheel of the vehicle. So long as the various indicators show green the brake linings on the various wheels are indicated as serviceable, but when the red appears on one or more of the indicators, this shows that the brake lining is substantially worn out and requires replacement.

From the foregoing, it is apparent that the invention provides an arrangement which will automatically adjust the brake shoes toward the brake drum as the linings on the shoes are gradually worn away so as to ensure proper adjustment at all times and render manual adjustment unnecessary, except when the linings are worn out and require replacement. It further provides an indicator which serves at all times to show the extent of wear on the brake linings on each wheel, making it unnecessary to take off the wheels of the vehicle to inspect the linings, and when the linings on one or more wheels are worn out, this fact is indicated by the red surface on the corresponding indicating drums being brought into position to be observed.

Having thus described the invention, what is claimed as new and desired to be secured by Letters Patent is:

1. In brake mechanism of the kind described, a brake drum, a brake shoe therein provided with a lining, means for moving the brake shoe toward the drum to apply the brakes, a control lever pivotally connected to said shoe and having one end arranged to engage the drum and cause gradual movement of the lever about its pivot as the brake shoe is moved against the drum and as the brake lining gradually wears away, and mechanism controlled by the movement of said lever about its pivot for gradually adjusting the brake shoe toward the drum to compensate for the wear on the lining.

2. In brake mechanism of the kind described, a brake drum, a pair of brake shoes therein provided with brake linings, means for moving said shoes toward the drum to apply the brakes, a control lever pivotally connected to one of said shoes and having one end arranged to engage the drum and cause gradual movement of the lever about its pivot as the brake linings wear away and the brake shoes are caused to move gradually nearer to the drum when the brakes are applied, and mechanism controlled by the movement of said lever about its pivot for gradually and simultaneously adjusting said brake shoes toward the drum to compensate for the wear on the linings.

3. In brake mechanism of the kind described, a rotating brake member, a brake shoe having a lining adapted to engage said brake member, an adjusting member to which said shoe is pivotally connected, means for moving the brake shoe toward said brake member to apply the brakes, and means controlled by the extent of movement of the brake shoe toward the brake member for automatically adjusting said member and brake shoe toward the brake member to compensate for wear on the brake lining, said last named means including a member movably mounted on the brake shoe and arranged to contact with the rotating brake member as the lining wears away.

4. In brake mechanism of the kind described, a brake drum, a pair of brake shoes arranged therein and having linings thereon, an adjusting member pivotally connected to each of said shoes, adjusting means for automatically moving said adjusting members toward said drum to adjust said shoes relative to the drum, and means controlled by the extent of movement of one of said shoes toward the drum for controlling the operation of said adjusting means, said last named means including a member movably mounted on one brake shoe and arranged to contact with the rotating brake drum as the lining wears away.

5. In brake mechanism of the kind described having a brake drum, a pair of brake shoes arranged therein and having brake linings thereon, an adjusting member operatively connected to each of said shoes, means for moving said shoes toward and from the drum to apply the brakes, a control member movably mounted on one of said shoes and having a part adapted to contact with the brake drum when said last named shoe is moved toward the drum and as the lining thereon is worn away, whereby said control member is caused to move relative to said last named shoe, and means controlled by such relative movement of said member for simultaneously and automatically moving said adjusting members toward the drum to take up clearance between the brake shoes and the drum due to wear on the linings.

6. In brake mechanism of the kind described, a brake drum, a pair of brake shoes therein provided with brake linings, means for moving said shoes toward the drum to apply the brakes, a movable adjusting member engaging each of said shoes, a control member pivotally supported on one of said shoes and having a part adapted to engage said drum whereby said member is moved about its pivot as the brake linings wear away and the brake shoes are moved against the drum, and means controlled by the pivotal movement of said control member for automatically adjusting said adjusting members and shoes toward the brake drum to compensate for the wear on the brake linings.

7. In brake mechanism of the kind described, a brake drum, a pair of brake shoes therein provided with brake linings, means for moving the shoes toward the drum to apply the brakes, a movable adjusting member for each of said shoes, a control member pivotally mounted on one of said shoes, having a part arranged to engage said drum whereby said member is caused to move about its pivot as the brake linings wear away and the brake shoes are moved against the drum, and means controlled by the pivotal movement of said control member for automatically adjusting said adjusting members and shoes toward the brake drum to compensate for the wear on the brake linings.

8. In brake mechanism of the kind described, a brake drum, a pair of brake shoes arranged therein and adapted to be moved toward the drum to apply the brakes, a pair of oppositely movable adjusting members to which said shoes are pivotally connected, means for simultaneously and automatically adjusting said adjusting members and shoes relative to the drum, and means controlled by the extent of movement of said brake shoes toward the drum in applying the brakes for effecting operation of said adjusting means, said last named means including a member movably mounted on one of said shoes and having a part arranged to contact with the brake drum.

9. In brake mechanism of the kind described, a brake drum, a pair of brake shoes arranged therein and adapted to be moved toward the drum to apply the brakes, a pivot support about which each brake shoe is adapted to swing, and means controlled by the extent of movement of the brake shoes toward the drum in applying the brakes for automatically and simultaneously adjusting said pivot supports relative to the drum, said last named means including a member movably mounted on one of said shoes and having a part arranged to contact with the brake drum.

10. In brake mechanism of the kind described, a brake drum, a pair of brake shoes arranged therein and provided with brake linings, means for moving the shoes toward the drum to apply the brakes, a pivot support for each shoe, means for automatically and gradually adjusting said pivot supports toward the drum as the brake linings are worn away, and means controlled by the extent of movement of the brake shoes toward the drum in applying the brakes for controlling said adjusting means, said last named means including a member movably mounted on one of asid shoes and having a part arranged to contact with the brake drum.

11. In brake mechanism of the kind described having a rotating brake member, a brake shoe having a lining thereon, means for moving said shoe toward said member to apply the brakes, an adjusting member engaging said shoe for gradually adjusting the same toward said rotating member to compensate for wear on the brake lining, and means controlled by the extent of movement of said shoe toward said rotating member in applying the brakes for automatically adjusting said adjusting member and shoe relative to said rotating member, said last named means including a member movably mounted on one of said shoes and having a part arranged to contact with the brake member.

12. In brake mechanism having a rotating brake member, a pair of brake shoes having brake linings thereon, means for moving said shoes against said member to apply the brakes, an adjusting member engaging each of said shoes for adjusting the same toward said rotating member to compensate for wear on the brake linings, and means controlled by the extent of movement of one of said shoes toward said rotating member when the brakes are applied for automatically adjusting both of said adjusting members and shoes relative to said rotating member, said last named means including a member movably mounted on one of said shoes and having a part arranged to contact with the brake member.

13. In brake mechanism of the kind described, a brake drum, a brake shoe therein provided with a lining, an adjusting member pivotally connected to said shoe adjacent one end thereof, means adjacent the other end thereof for moving the shoe about said pivotal connection toward the drum to apply the brake, a control member pivotally mounted on said shoe and having a part arranged to contact with said drum whereby said member is gradually moved about its pivot as the brake lining wears away and the shoe is moved toward the drum in applying the brakes, and means controlled by the pivotal movement of said control member for gradually adjusting said adjusting member and shoe toward the drum.

14. In brake mechanism of the kind described, a brake drum, a pair of oppositely disposed brake shoes therein provided with brake linings, means arranged between two adjacent ends of said shoes for expanding the same outwardly to apply the brakes, adjusting mechanism arranged between the other adjacent ends of said shoes, said adjusting mechanism comprising oppositely movable adjusting members to which said shoes are pivotally connected, and a control member movably mounted on one of said shoes and having a part arranged to engage said drum for effecting operation of said adjusting mechanism as the brake linings wear away.

15. In brake mechanism of the kind described, a brake drum, a pair of brake shoes arranged therein, a casing rigidly secured in said drum between adjacent ends of said shoes, a pair of adjusting members movably mounted in said casing and pivotally connected to said shoes, adjusting mechanism in said casing for automatically and simultaneously moving said adjusting members and shoes toward the drum, and means operated by the extent of movement of one of said brake shoes toward the drum in applying the brakes for controlling the operation of said adjusting mechanism, said last named means including a member movably mounted on one of said shoes and having a part arranged to contact with the brake drum.

16. In brake mechanism of the kind described, a rotating brake drum, a brake shoe arranged adjacent thereto and provided with a brake lining, mechanism for automatically adjusting said shoe toward said drum as the brake lining wears away, an indicator having designations thereon to indicate the extent of wear of the brake lining, said mechanism including a movable member, the position of which is gradually changed as the brake lining wears away and the brake shoe is adjusted, and a connection between said member and indicator for operating the latter as the brake shoe is adjusted toward said rotating member.

17. In brake mechanism of the kind described, a brake drum, a brake shoe therein having a brake lining, mechanism for automatically taking up the wear on the brake lining, said mechanism comprising a rotatable shaft, an indicator having designations thereon to indicate the extent of wear of the brake lining, and a connection between said rotatable shaft and said indicator for operating the latter as the take up mechanism operates.

18. In brake mechanism of the kind described, a rotating brake member, a brake shoe having a lining, means for automatically adjusting the brake shoe toward said member to compensate for wear on the lining, said means including a rotatable shaft, an indicator adapted to show the extent of wear on the brake lining, and a flexible drive shaft between said first named shaft and said indicator for operating the latter.

19. In brake mechanism of the kind described, a brake drum, a brake shoe therein having a lining, a movable indicator having a series of designations thereon adapted to show the extent of wear on the brake lining, mechanism connected to said brake shoe for automatically adjusting the same toward the drum to take up wear on the lining, said mechanism including a rotatable member, the position of which is changed as said shoe is adjusted toward the drum, and connections between said rotatable member and said indicator for moving the latter as the brake shoe is automatically adjusted toward the drum.

20. In brake mechanism of the kind described, a brake drum, a brake shoe therein having a lining, a movable indicator having a series of designations thereon adapted to show at all times the extent of wear on the brake lining, mechanism connected to said brake shoe for automatically adjusting the same toward the brake drum to take up wear on the lining, said mechanism including a rotating shaft, and a connection between said shaft and indicator for moving the latter as the brake shoe is adjusted toward the drum.

21. In brake mechanism for automobiles and the like comprising an indicator having a plurality of separately movable indicating elements, a brake drum connected to each of a plurality of wheels on the automobile, a brake shoe in each drum having a lining, mechanism connected to each of said brake shoes for automatically adjusting the same toward the drum to take up wear on the lining, each of said mechanisms including a rotatable member, the position of which is gradually changed as the brake shoes are adjusted toward the drum and means arranged between each of said rotatable members and one of said movable elements of the indicator whereby the condition of wear of the lining on each brake shoe is separately indicated.

JOHN B. DES ROSIERS.